United States Patent
Kitaura et al.

(10) Patent No.: US 8,110,273 B2
(45) Date of Patent: *Feb. 7, 2012

(54) OPTICAL INFORMATION RECORDING MEDIUM, RECORDING/REPRODUCING METHOD THEREOF AND RECORDING/REPRODUCING APPARATUS

(75) Inventors: Hideki Kitaura, Kyoto (JP); Yukako Doi, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 684 days.

This patent is subject to a terminal disclaimer.

(21) Appl. No.: 12/095,894

(22) PCT Filed: Nov. 27, 2006

(86) PCT No.: PCT/JP2006/323582
§ 371 (c)(1),
(2), (4) Date: Jun. 2, 2008

(87) PCT Pub. No.: WO2007/063800
PCT Pub. Date: Jun. 7, 2007

(65) Prior Publication Data
US 2009/0323495 A1    Dec. 31, 2009

(30) Foreign Application Priority Data

Dec. 2, 2005 (JP) ................. 2005-349022
Dec. 26, 2005 (JP) ................. 2005-372889

(51) Int. Cl.
*B32B 3/02* (2006.01)
(52) U.S. Cl. ............... 428/64.1; 428/64.4; 428/64.5; 428/64.6; 430/270.12; 430/270.13

(58) Field of Classification Search ............. 428/64.4; 430/270.12
See application file for complete search history.

(56) References Cited

U.S. PATENT DOCUMENTS

| 3,971,874 A | 7/1976 | Ohta et al. |
| 4,624,914 A | 11/1986 | Kimura et al. |
| 5,498,507 A * | 3/1996 | Handa et al. ............ 430/273.1 |
| 6,228,457 B1 | 5/2001 | Ueno et al. |
| 6,229,785 B1 | 5/2001 | Kitaura et al. |

(Continued)

FOREIGN PATENT DOCUMENTS
CN   1200700   12/1998
(Continued)

OTHER PUBLICATIONS

Supplementary European Search Report issued Feb. 6, 2009 in the European Patent Application No. EP 06833386.3.

(Continued)

*Primary Examiner* — Elizabeth Mulvaney
(74) *Attorney, Agent, or Firm* — Wenderoth, Lind & Ponack, L.L.P.

(57) ABSTRACT

An optical information recording medium, recording/reproducing method thereof, and recording/reproducing apparatus with superior signal quality for high-density recording that has high storage reliability is provided. The optical information recording medium has at least one information layer having a recording layer and a dielectric layer in order on a transparent substrate. The dielectric layer is comprised of greater than or equal to 50 molecule percent and less than or equal to 98 molecule percent of Zn—O, and greater than or equal to 2 molecule percent to less than or equal to 50 molecule percent of one or more compounds selected from the group consisting of Y—O, Ce—O, Nb—O, Ta—O, Cr—O and Mo—O.

17 Claims, 3 Drawing Sheets

U.S. PATENT DOCUMENTS

| | | | |
|---|---|---|---|
| 6,881,466 B2 * | 4/2005 | Kojima et al. | 428/64.1 |
| 6,921,568 B2 * | 7/2005 | Inoue et al. | 428/64.1 |
| 7,057,252 B2 * | 6/2006 | Uno et al. | 257/432 |
| 7,635,440 B2 | 12/2009 | Hosono et al. | |
| 7,718,095 B2 | 5/2010 | Hosono et al. | |
| 2003/0190447 A1 | 10/2003 | Kojima et al. | |
| 2004/0023069 A1 | 2/2004 | Kojima et al. | |
| 2004/0258872 A1 | 12/2004 | Nee | |
| 2005/0002322 A1 | 1/2005 | Mizuno et al. | |
| 2005/0253210 A1 | 11/2005 | Uno et al. | |
| 2006/0110569 A1 | 5/2006 | Yashiro et al. | |
| 2006/0147740 A1 | 7/2006 | Hosono et al. | |
| 2008/0299415 A1 | 12/2008 | Hosono et al. | |

FOREIGN PATENT DOCUMENTS

| | | |
|---|---|---|
| CN | 1445770 A | 10/2003 |
| EP | 0 860 295 | 8/1998 |
| EP | 1 211 679 | 6/2002 |
| EP | 1 575 041 | 9/2005 |
| JP | 50-46317 | 4/1975 |
| JP | 60-203490 | 10/1985 |
| JP | 61-68296 | 4/1986 |
| JP | 62-88152 | 4/1987 |
| JP | 11-322413 | 11/1999 |
| JP | 11-353707 | 12/1999 |
| JP | 2002-251778 | 9/2002 |
| JP | 2003-123311 | 4/2003 |
| JP | 2004-119003 | 4/2004 |
| JP | 2004-234817 | 8/2004 |
| JP | 2005-174402 | 6/2005 |
| JP | 2005-232471 | 9/2005 |
| JP | 2005-313474 | 11/2005 |
| JP | 2005-317093 | 11/2005 |
| WO | 98/09823 | 3/1998 |
| WO | 2004/027770 | 4/2004 |
| WO | 2004/079038 | 9/2004 |
| WO | 2004/094135 | 11/2004 |
| WO | 2004/105009 | 12/2004 |
| WO | 2005/091282 | 9/2005 |

OTHER PUBLICATIONS

International Search Report issued Mar. 6, 2007 in International (PCT) Application No. PCT/JP2006/323582.

Chinese Office Action issued Mar. 11, 2010 in Chinese Application No. 200680044259.

An Office Action issued Mar. 2, 2011 in corresponding Chinese application No. 20060044259.X.

An Office Action issued Mar. 2, 2011 in corresponding Chinese application No. 200680044259.X.

* cited by examiner

OPTICAL INFORMATION RECORDING MEDIUM, RECORDING/REPRODUCING METHOD THEREOF AND RECORDING/REPRODUCING APPARATUS

BACKGROUND OF THE INVENTION

I. Technical Field

The present invention relates to an optical information recording medium, recording/reproducing method thereof, and recording/reproducing apparatus capable of being recorded with and reproducing information signals of a high signal quality as a result of irradiating a thin-film formed on a substrate with a high-energy light beam such as a laser.

II. Description of the Related Art

Extensive research and development have taken place into recording media where a thin-film is formed on a transparent substrate. An information signal is then recorded/reproduced as a result of irradiating the thin-film with laser light focused to give a microscopic spot. Materials where metallic elements that have an oxide as a base material are dispersed on a substrate are well-known as write-once recording media. Such materials include, for example, materials formed with a recording thin-film of TeOx (where $0<x<2$) that is a mixture of Te and $TeO_2$ base material (for example, refer to Japanese Unexamined Patent Publication S50-46317). It is possible to obtain a substantial change of reflection rate by irradiating this recording medium with a light beam for reproduction.

TeOx recording thin-films are in an amorphous state after forming a film without performing initialization processing such as laser annealing. This means that it is possible to form recording marks on the crystal by laser irradiation. Recording media employing this recording thin-film can only be utilized as write-once recording media. Correction and deletion by overwriting is not possible because the process is irreversible.

With TeOx recording thin-films, a small amount of time is required until the signal becomes saturated after recording, i.e. until crystallization within the recording thin-film due to irradiation with laser light becomes sufficiently advanced. Media using this recording thin-film are therefore not suited to applications requiring a high-speed response, such as, for example, with computer data files where data is recorded on a disc and is then verified after one rotation, without modification. To overcome this, adding of Pd, or Au etc. to the TeOx as a third element has been proposed (for example, refer to Japanese Unexamined Patent Publication S60-203490, Japanese Unexamined Patent Publication S61-68296, and Japanese Unexamined Patent Publication S62-88152).

It is considered that Pd and Au promote crystalline growth of the Te within the TeOx thin-film during irradiation with laser light. Crystal grains of Te and a Te—Pd alloy or a Te—Au alloy can therefore be formed rapidly. The resistance of Pd and Au to oxidation is also high and there is therefore no degradation of the high moisture resistance of the TeOx thin-film.

Further, methods for improving recording density by shortening the wavelength of the laser light, or making the spot diameter of the laser light smaller by increasing the numerical aperture of an objective lens focusing the light are typically employed as fundamental ways of increasing the amount of information that can be handled by a single medium. Multi-layer media where a number of information layers are stacked on top of each other have also been implemented in recent years.

Recording media where the composition of recording material is such that Pd, Au are added to the TeOx and the thin-films are improved are also proposed to implement high-density recording and multi-layer recording (for example, refer to PCT WO98/09823 (page 20-23, FIG. 4)). It is also possible to increase recording density by suppressing thermal interference between marks. This is achieved using the optical enhancing effects and cooling resulting from adding a reflective layer (for example, refer to Japanese Unexamined Patent Publication 2002-251778).

In the above high-density recording, and particularly when a violet-blue laser is employed, the recording layer is subjected to a heat load due to laser heating. This can cause damage and can cause the quality of recorded signals to be degraded as a result of increases in noise, etc. A protective layer of a dielectric etc. is therefore provided in order to prevent this. The following are demanded from the performance of the protective layer: (1) high heat resistance, protecting the recording layer from thermal damage; (2) high adhesion to the recording layer, not causing peeling or diffusing even under high-temperatures and high-humidity; (3) a high degree of transparency and an appropriate refractive index, enhancing optical changes of the recording layer; (4) stability to heat, not fluctuating particle diameter or composition distribution even under high temperatures and high humidity. It is extremely important for write-once recording media that storage reliability is high in addition to high-density recording also being possible. For example, it is also possible for the influence of thermal damage that was not apparent directly after recording to manifest itself and cause noise to increase in the case of, for example, installation under high-temperatures or high-humidity even when sufficient signal quality was obtained at the time of recording.

Noise increases when the recording layer becomes damaged as a result of being heated by a laser so as to be subjected to a heat load. It has therefore been effective to provide a layer with high heat-dissipating properties such as metal as a way of preventing degradation of the quality of the recording signal other than providing a protective layer such as a dielectric. It is therefore typical to give the layer a reflective function using a material having an appropriate optical constant, i.e. make the layer a reflective layer. The optical interference effect is then utilized so that optical absorptance of the recording layer is increased, with optical changes in the recording layer then being enhanced and the recording density being improved. A high resistance to heat, adherence to the neighboring layer, and high storage reliability are also demanded of this reflective layer.

SUMMARY OF THE INVENTION

In order to resolve the above problems, it is an object of the present invention to provide an optical information recording medium with superior signal quality in high-density recording and high storage reliability. In order to resolve the above problem, an optical information recording medium of the present invention has at least one information layer having a recording layer and a dielectric layer in order on a transparent substrate. The dielectric layer is comprised of greater than or equal to 50 molecule percent and less than or equal to 98 molecule percent of Zn—O, and greater than or equal to 2 molecule percent to less than or equal to 50 molecule percent of one or more compounds selected from the group consisting of Y—O, Ce—O, Nb—O, Ta—O, Cr—O, and Mo—O.

In the method of recording/reproducing information for the optical information recording medium of the present invention carries out recording/reproducing information to and from the optical information recording medium using an optical beam of a wavelength of 450 nm.

Further, the recording/reproduction apparatus for an optical information recording medium of the present invention includes at least a recording/reproduction unit that irradiates the optical information recording medium with an optical beam of a wavelength of less than or equal to 450 nm and performs recording/reproduction, and a detecting unit that detects light reflected by the optical information recording medium.

According to the present invention, it is possible to provide an optical information recording medium, a recording/reproducing method thereof and a recording/reproducing device that provides superior signal quality for high-density recording and has high storage reliability.

DETAILED DESCRIPTION OF THE INVENTION

The following is a detailed description with reference to the drawings of preferred embodiments of the present invention.

First Embodiment

Figure 1:
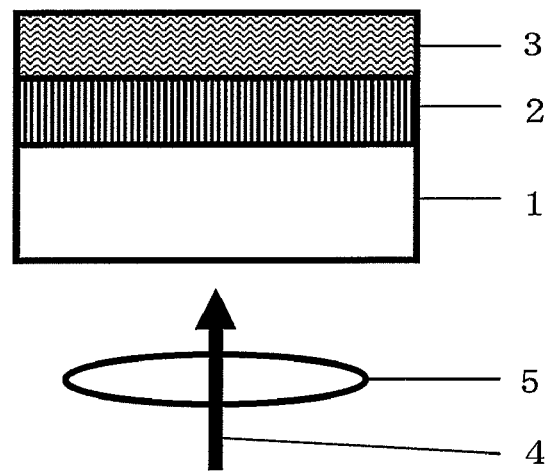
FIG. 1 is a cross-section of an example configuration for an optical information recording medium of the present invention.
Figure 2:
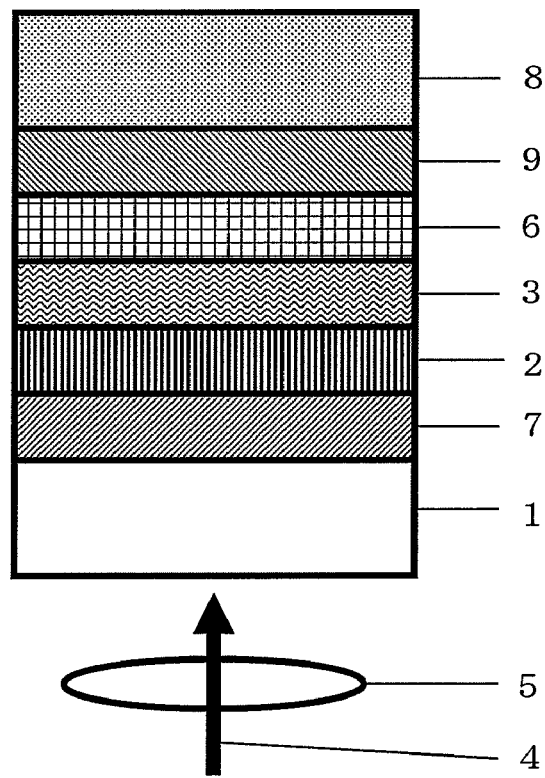
FIG. 2 is a further cross-section of an example configuration for an optical information recording medium of the present invention.
Figure 3:
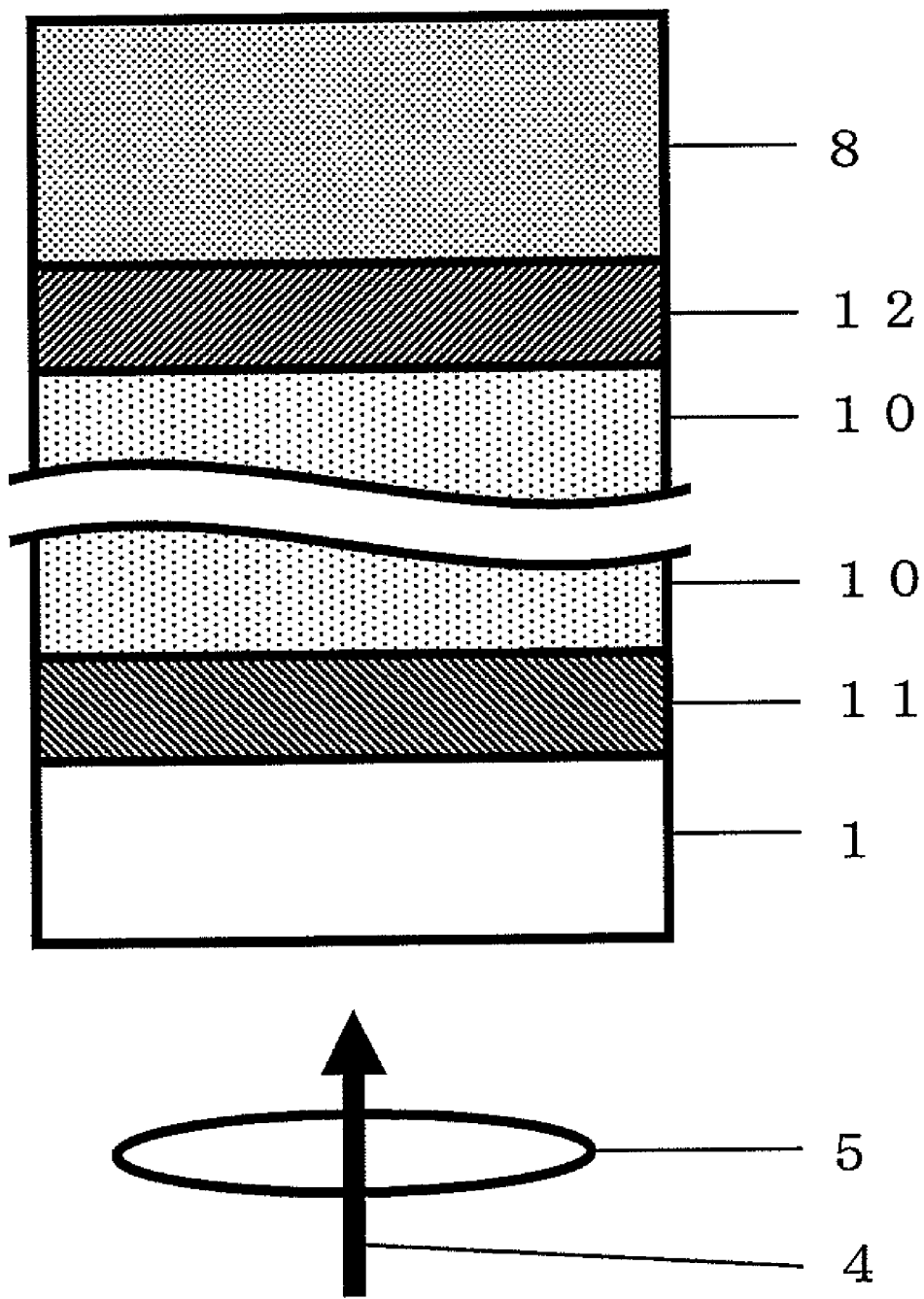
FIG. 3 is another cross-section of an example configuration for an optical information recording medium of the present invention.

FIGS. 1 to 3 are partial cross-sections of examples of optical information recording media of the present invention.

As shown in FIG. 1, an optical information recording medium of the present invention has at least a recording layer 2 and a dielectric layer 3 provided as an information layer on a transparent substrate 1 in that order. Laser light 4 from the side of the transparent substrate 1 is focused by an objective lens 5. The laser light 4 is then applied onto the optical information recording medium and recording/reproduction takes place.

As shown in FIG. 2, it is also possible to provide: a reflective layer 6 on the opposite side of the dielectric layer 3 to the recording layer 2; a protective layer 7 between the transparent substrate 1 and the recording layer 2; and a protective substrate 8 on the opposite side of the reflective layer 6 to the dielectric layer 3 or an upper protective layer 9 between the reflective layer 6 and the protective substrate 8, as necessary.

It is also possible, as shown in FIG. 3, for the optical information recording medium of the present invention to be provided with n information layers from a first information layer 11 to an n-th information layer 12 (where n is an integer of 2 or more) between the transparent substrate 1 and the protective substrate 8 with a separating layer 10 interposed therebetween. It is necessary for at least one of the information layers to have the same multilayer thin-film structure as shown in FIG. 1 or FIG. 2 in order from the side close to the transparent substrate 1. The laser light 4 from the side of the transparent substrate 1 is focused by an objective lens 5. The laser light 4 is then applied onto each information layer of the optical information recording medium and recording/reproduction takes place.

It is also possible to include write-once recording material, and in particular, oxide base material, as the material for the recording layer 2. The oxide base material can be Te—O, Sb—O, Bi—O, Ge—O, Sn—O, Ga—O, and In—O, which give superior recording/reproduction characteristics. The oxide base material can be one or a combination of these materials. It is also possible to add any of Te, Sb, Bi, Ge, Sn, Ga, In, Pd, Au, Pt, Ni, Ag, and Cu to the recording layer 2 in addition to the oxide base material to ensure crystallization at high-speed as a result of rising temperatures. It is further possible to add one or more elements selected from the group consisting of Te, Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au, and Bi when Te—O is used as the oxide base material.

It is possible for 80 molecule percent or more, and more preferably 90 molecule percent or more of a main component including the oxide base material and additives to be included in the recording layer 2. It is also possible to add oxide, nitride, fluoride, carbide, sulphide, boride, or a non-metallic element such as O, N, F, C, S, B at a composite ratio of 10 molecule percent or less and preferably 5 molecule percent or less to the whole of the recording layer 2 as necessary in addition to the main component. This is to adjust the crystallization speed, thermal conductivity, and optical constant, or improve the heat resistance and moisture resistance.

The film thickness of the recording layer 2 is preferably from 2 nm to 70 nm inclusive, and more preferably 4 nm to 40 nm inclusive. If the film thickness of the recording layer 2 is 2 nm or greater, sufficient reflectance and change in reflectance are obtained, so that a C/N ratio is also large. If the thickness is 70 nm or less, heat dissipation within the thin-film surface of the recording layer 2 becomes relatively small. The contour of the recording marks therefore becomes sharper and a sufficient C/N ratio can also be obtained in high-density recording.

The recording layer 2 can also be a rewritable recording medium rather than just a write-once recording medium. A phase-change recording medium such as a medium having Te and/or Sb etc. as main constituents is also suitable as a re-writable recording medium. Re-writable recording materials are amorphous in a film-forming state. It is therefore typical when recording information signals to form amorphous marks in an initial state of being subject to initial processing of crystallization as a result of annealing using laser light etc. Not only irradiation with laser light but also a cooling effect by the reflective layer 6 is necessary to form an amorphous mark.

A material including 50 molecule percent to 98 molecule percent of Zn—O as a main component and including 2 molecule percent to 50 molecule percent of one or more compounds selected from the group consisting of Y—O, Ce—O, Nb—O, Ta—O, Cr—O and Mo—O as a sub-component can be adopted as the material for the dielectric layer 3. An additional sub-component of one or more compounds selected from the group consisting of Al—O, Ga—O, In—O, Bi—O, and Sb—O can also be added to 2 molecule percent to 40 molecule percent to the dielectric layer 3.

In this case, the material for the dielectric layer 3 is a complex oxide denoted by $A_xB_yC_zD_w$. Here, A is ZnO, B is a compound selected from the group consisting of $Y_2O_3$, $CeO_2$, $Nb_2O_5$, $Ta_2O_5$, $Cr_2O_3$, and $MoO_3$, C is a compound selected from the group consisting of $TeO_2$, $Sb_2O_3$, $Bi_2O_3$, $GeO_2$, $SnO_2$, $Ga_2O_3$, and $In_2O_3$, and D denotes further components. Further, $x+y+z+w=1$ (100 mol %) is satisfied, and $0.5 \leq x \leq 0.98$, $0.02 \leq y \leq 0.5$, $0.02 \leq z \leq 0.4$, $0 \leq w \leq 0.1$. The values are converted so that each element becomes $A_xB_yC_zD_w$ but A, B, and C by no means have to be an oxide of the above-described chemical components. Each oxide included in the dielectric layer 3 does not have to be a compound composition. For example, there are also cases where oxygen deficient compositions can be used, or where deficient compositions are used to improve adherence to the recording layer 2. It is also possible to add material components other than the above to a range in the order of 10 molecule percent without detriment to the original function.

This dielectric layer 3 satisfies all the conditions of (1) high heat resistance, protecting the recording layer 2 from thermal damage, (2) high adhesion to the recording layer 2, not causing peeling or diffusing even under conditions of high-temperature and high-humidity, (3) a high degree of transparency and an appropriate refractive index, enhancing optical changes of the recording layer 2, and (4) stability to heat, not fluctuating particle diameter or composition distribution even under high temperatures and high humidity. The dielectric layer 3 also functions as a light absorbing layer. In particular, the main component Zn—O is diffused appropriately at the boundary with the recording layer 2. This is considered to contribute to the effect of preventing degradation of the recording signal even under high temperature or high humidity by stabilizing the amorphous state of the recording layer 2. If the Zn—O within the dielectric layer 3 is 50 molecule percent or more, this effect can be obtained and sufficient reliability is obtained. If the Zn—O within the dielectric layer 3 is 98 molecule percent or less, fluctuation in particle diameter and composition distribution can be suppressed and sufficient reliability can be obtained. The sub-component and the additional sub-component have the effect of suppressing variation in particle diameter and composition distribution of the main component and the effect of complicating the structure to improve stability of the recording layer 2 and adherence with the recording layer 2. If the proportion within the dielectric layer 3 is too small, these effects are no longer obtained. Conversely, if the proportion is too large, the effects of the main component are no longer obtained. It is not essential for the dielectric layer 3 to adjoin the recording layer 2 and another layer may be interposed in between as necessary. For example, a layer of ZnS or a compound of ZnS and $SiO_2$ can be inserted to further increase adhesiveness.

The material for the reflective layer 6 can be a metal such as Ag, Au, Al, Cu or an alloy taking these metals as a base but an Ag alloy, having high-reflectance, is particularly preferable. There are no particular limits on the elements added to the Ag. However, for example, Pd, Pt, Ni, Ru, Au, Cu, Zn, Al, Ga, In, Si, Ge, Sn, Sb, Bi, Ca, Mg, Y, Nd, Sm, Ti, Cr, O, N, F, C, S, and B etc. where aggregation prevention and the ability to make particle diameter small are substantial for small amounts are applicable. Of these, the effects are higher for Pd, Cu, Bi, Nd, Y, and Ga, from which one or a number of elements can be used. To ensure that these effects are exhibited and that there is no detriment to the high thermal conductivity and reflectance of the Ag, it is preferable for the proportion of the added element to be 0.1 molecule percent to 5 molecule percent for the whole of the reflective layer 6. A proportion of 0.05 molecule percent to 5 molecule percent is still more preferable.

The effects of the dielectric layer 3 described above are by no means essential when a material with high adhesiveness that is capable of a high degree of suppression of increases in noise is used as the reflective layer 6. It is therefore also possible to use an oxide, nitride, carbide, or fluoride etc. as an intermediate layer instead. For example, there are cases where a material where the proportion of Zn—O is less than 50 molecule percent or more than 98 molecule percent.

For example, one or more compounds of an oxide of Y, Ce, Ti, Zr, Nb, Ta, Co, Zn, Al, Si, Ge, Sn, Pb, Sb, Bi, and Te, a nitride of Ti, Zr, Nb, Ta, Cr, Mo, W, B, Al, Ga, In, Si, Ge, Sn, Pb a carbide of Ti, Zr, Nb, Ta, Cr, Mo, W, Si, a sulfide of Zn or Cd etc., a selenide or telluride, and a fluoride of a rare earth element such as Mg, Ca, or La, and C, Si or Ge etc. can be used as a material for the protective layer 7. Of these materials, a material that is substantially transparent with low thermal conductivity such as, for example, a mixture of ZnS and $SiO_2$ is particularly preferable. The protective layer 7 can be the same material as the dielectric layer 3. The film thickness of the protective layer 7 is preferably 2 nm to 80 nm inclusive and still more preferably 5 nm to 50 nm inclusive.

It is possible to use the material given for the protective layer 7 as the material for the upper protective layer 9. However, the material does not have to be the same as for the protective layer 7. For example, it is preferable to use a material that does not include S when the reflective layer 6 includes Ag or an Ag alloy. The upper protective layer 9 can also be the same material as for the dielectric layer 3. The upper protective layer 9 is preferably 2 nm to 80 nm inclusive, and still more preferably 5 nm to 50 nm inclusive.

Each of the thin-films can be formed using gas phase thin-film deposition techniques such as, for example, vacuum deposition, sputtering techniques, ion plating techniques, CVD (Chemical Vapor Deposition) techniques, and MBE (Molecular Beam Epitaxy) techniques, etc. It is possible to investigate the materials and composition for each layer for each of the thin-films described above using Auger electron spectroscopy, X-ray electron spectroscopy, or secondary ion mass spectrometry. In the working example of this application, it was confirmed that target material composition for each layer and the composition of thin-films actually formed is substantially the same. There are, however, also cases where the target material composition and the composition of thin-films actually formed are different due to the film-forming apparatus, the film-forming conditions and the target manufacturing methods, etc. In such cases, it is preferable to obtain a correction coefficient for correcting shifts in composition beforehand through experimentation and decide upon the composition of the target material so that a thin-film of the desired composition is obtained.

It is preferable for the material for the transparent substrate 1 to be substantially transparent to wavelengths of the laser light 4. A polycarbonate resin, polymethylmethacrylate resin, polyolefin resin, norbornene-based resin, ultraviolet-curable resin, glass, or an appropriate combination thereof can be used as the material for the transparent substrate 1. The thickness of the transparent substrate 1 is not particularly limited but can be, for example, in the order of 0.01 to 1.5 mm, in the order of 0.3 to 0.8 mm when the numerical aperture number NA of the objective lens 5 is, for example, 0.6 to 0.7, and in the order of 0.03 to 0.2 mm when the NA is in the order of 0.8 to 0.9. When the transparent substrate 1 is thin at, for example, 0.3 mm or less, the sheet-shaped resin is applied onto an information layer. Alternatively, ultraviolet-curable resin is applied using spin-coating and is then cured using ultraviolet radiation.

It is possible to use the same material for the transparent substrate 1 as is used for the protective substrate 8. A different material to the transparent substrate 1 can also be used and it is not essential for the material to be transparent to the wavelength of the laser light 4. The thickness of the protective substrate 8 is also not limited but can be in the order of 0.01 to 3.0 mm.

Ultraviolet curable resin can also be used for the separating layer 10. It is necessary for the thickness of the separating layer 10 to be at least a thickness greater than a focal depth, which is decided by the numerical aperture number NA of the objective lens 5 and the wavelength λ of the laser light 4. This ensures that crosstalk from other layers while one of the layers of the first information layer 11 to the n-th information layer 12 is being read is small. It is also necessary for this thickness to be of a range where focusing is still possible for all of the information layers. For example, when λ=660 nm and NA=0.6, the separating layer 10 should be 10 μm to 100 μm thick, and when λ=405 nm and NA=0.85, the separating layer 10 should be 5 μm to 50 μm thick. There is also the possibility that it will be possible for the thickness of the separating layer 10 to be thinner as optical systems and technology for reducing crosstalk between layers advances.

It is also possible to adopt a double-sided structure by pasting opposing protective substrates 8 of two optical information recording media 2. This doubles the amount of information that can be stored on one medium.

Each thin-film and separating layer 10 described above can be formed on or applied to the protective substrate 8 after being sequentially formed on the transparent substrate 1. Conversely, the transparent substrate 1 can be formed or applied after sequential forming on the protective substrate 8. In particular, the latter is suitable when, for example, the numerical aperture number NA of the objective lens 5 is large at 0.8 or more, and the transparent substrate 1 is thin at 0.2 mm or less. In this case, a groove that is a channel for guiding laser light or an undulating pattern for an address signal etc. are formed on the surface of the protective substrate 6 and the separating layer 10, i.e. it is necessary to transfer a desired undulating pattern in advance from an item such as a stamp. During this time, it is possible to use 2P techniques (photopolymerization techniques) when injection techniques that are normally employed are difficult when layer thickness is thin as with the separating layer 10.

Figure 4:
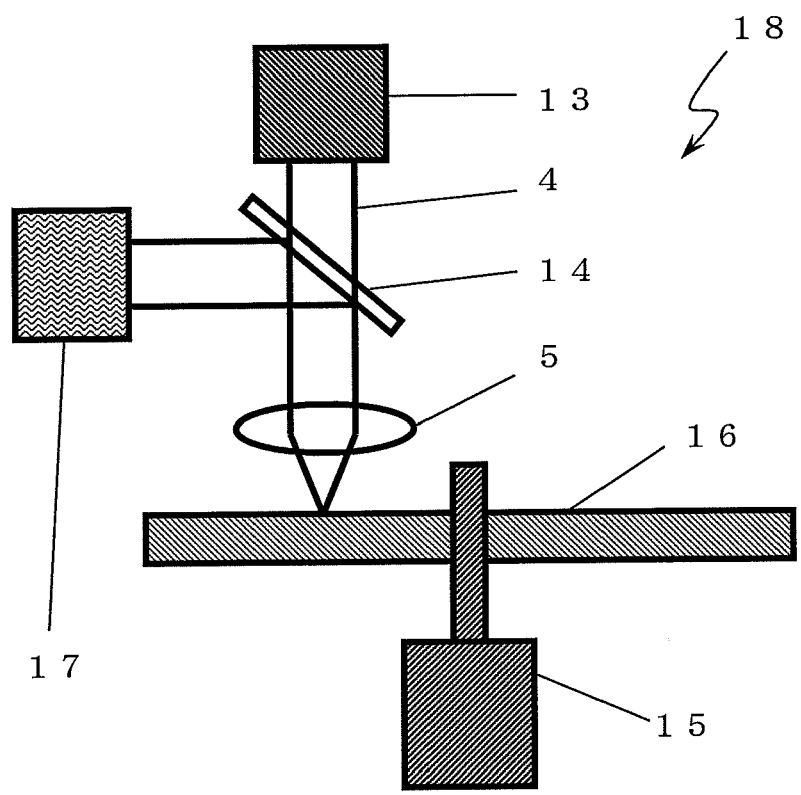
FIG. 4 is an outline view of an example of recording/reproduction apparatus for an optical information recording medium of the present invention.

An outline view of an example of a minimum apparatus configuration necessary for recording/reproducing apparatus for carrying out recording/reproducing for the optical information recording medium of the present invention is shown in FIG. 4. This apparatus includes at least a recording/reproduction unit 18 that irradiates the optical information recording medium with an optical beam of a wavelength of 450 nm or less and carries out information recording/reproduction, and a photodetector 17 (detection unit) that detects light reflected back from the optical information recording medium. An optical modulation unit and optical members such as a lens and mirror etc. can also further be provided. Specifically, laser light 4 outputted by the laser diode 13 passes through a half-mirror 14 and the objective lens 5. The laser light 4 is then focused onto an optical information recording medium 16 rotated by the motor 15. Light reflected by the optical information recording medium 16 then becomes incident to the photodetector 17 and a signal is detected.

Figure 5:
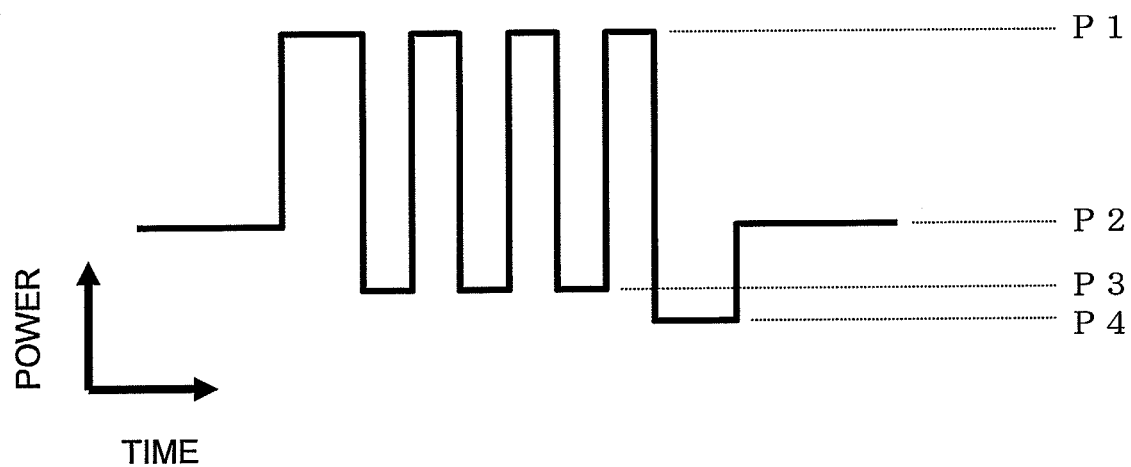
FIG. 5 is an outline view of an example of a recording pulse waveform used in recording/reproduction apparatus for an optical information recording medium of the present invention.

The intensity of the laser light 4 is modulated between a number of power levels while recording the information signal. Modulation of the drive current of a semiconductor laser is preferable in order to modulate the laser intensity. It is also possible to modulate laser intensity using an electro-optical modulator or an acoustooptical modulator. A single rectangular pulse for peak power P1 is appropriate for portions where marks are to be formed. There are cases, however, where a recording pulse series of a number of pulse series modulated between the peak power P1 and a bottom power P3 (where P1>P3) is used, as shown in FIG. 5. This is in order to achieve a uniform mark width without surplus heat particularly when forming long marks. A cooling section of cooling power P4 can also be provided after the end of the pulses. Portions where no mark is formed are kept fixed at the bias power P2 (where P1>P2).

Unevenness occurs at the positions of edges of marks due to patterns such as the lengths of the marks to be recorded and the lengths of spaces either side and can cause increases in jitter. The recording/reproducing method for the optical information recording medium of the present invention prevents this and improves jitter. This is achieved by adjusting and compensating as necessary so that the position and length of each pulse of the pulse trains are at edge positions that can be matched with each pattern.

WORKING EXAMPLES

A detailed explanation of the present invention is given in the working examples below but the working examples by no means limit the present invention.

First Working Example

A protective substrate was made of polycarbonate resin, is substantially 12 cm in diameter, substantially 1.1 mm thick, had a groove pitch of 0.32 μm and has a groove depth of 20 nm. A reflective layer of $Ag_{98}Pd_1Cu_1$ 40 nm thick, a dielectric layer of $(ZnO)_{80}(Cr_2O_3)_5(In_2O_3)_{15}$ 10 nm thick, a recording layer of $Te_{36}O_{54}Pd_{10}$ 20 nm thick, and a protective layer of $(ZnS)_{80}(SiO_2)_{20}$ 20 nm thick were each formed in order by sputtering on the surface of the surface where the channel of the protective substrate is formed as the second information layer. The same pattern as for the protective substrate was then transferred onto the surface of the second information layer using ultraviolet-curing resin using 2P techniques to give a separating layer 25 μm thick. Each of the thin-films of a 10 nm-thick reflective film of $Ag_{98}Pd_1Cu_1$, a 10 nm-thick dielectric layer of various materials, a 10 nm-thick recording layer of $Te_{36}O_{54}Pd_{10}$, and a 20 nm-thick protective layer of $(ZnS)_{80}(SiO_2)_{20}$ were then formed in order on the surface of the separating layer as the first information layer using sputtering techniques. A transparent substrate 75 μm thick was then formed on the surface of the first information layer using ultraviolet-curable resin.

As the working examples of this application, discs 1 to 6 were made at the dielectric layer of the first information layer using $(ZnO)_{80}(Cr_2O_3)_{20}$, $(ZnO)_{80}(Y_2O_3)_{20}$, $(ZnO)_{80}(Cr_2O_3)_5(Sb_2O_3)_{15}$, $(ZnO)_{80}(Cr_2O_3)_5(In_2O_3)_{15}$, $(ZnO)_{60}(Cr_2O_3)_{10}(In_2O_3)_{30}$ and $(ZnO)_{90}(Cr_2O_3)_5(In_2O_3)_5$. Discs 7 to 12 were also made at the dielectric layer of the first information layer as comparative examples using $(ZnO)_{80}(SiO_2)_{20}$, $(ZnO)_{80}(TiO_2)_5(In_2O_3)_{15}$, ZnO, $Cr_2O_3$, $(ZnO)_{40}(Cr_2O_3)_{60}$, and $(ZnO)_{99}(Cr_2O_3)_1$.

An optical system of light of wavelength 405 nm and a lens numerical aperture of 0.85 irradiates the grooves of each disc, i.e. portions of the grooves and portions between the grooves that appear convex to the front as viewed from the side of the incident laser light with the laser light while rotating at a linear velocity of 4.9 m/s. This recorded a single signal of frequency 16.5 MHz.

While recording the signal, a single pulse 6 ns in width was used for the power level P1, with P2, P3, P4 and the reproduction power all being 0.7 mW. Under these conditions, a signal is recorded on an unrecorded track one time and the C/N ratio of the single signal was measured using a spectrum analyzer. Measurement took place while arbitrarily changing P1 and power was set to a value 1.25 times the power where the amplitude is lower than the maximum by 3 dB. After measuring the C/N ratio (C/N ratio before acceleration) for the power set for each disc, each disc was maintained at a temperature of 90 degree Celsius and a relative humidity of 80% for 100 hours in order to confirm storage reliability. C/N ratio (C/N ratio after acceleration) was then measured again. The results for the first information layer are shown in table 1. Results of "good" and "superior" indicate materials that could withstand the conditions in actual use.

TABLE 1

| Disc No. | dielectric layer | C/N ratio before acceleration | fall after acceleration |
|---|---|---|---|
| 1 | $(ZnO)_{80}(Cr_2O_3)_{20}$ | superior | superior |
| 2 | $(ZnO)_{80}(Y_2O_3)_{20}$ | superior | good |
| 3 | $(ZnO)_{80}(Cr_2O_3)_5(Sb_2O_3)_{15}$ | good | superior |
| 4 | $(ZnO)_{80}(Cr_2O_3)_5(In_2O_3)_{15}$ | superior | superior |
| 5 | $(ZnO)_{60}(Cr_2O_3)_{10}(In_2O_3)_{30}$ | good | good |
| 6 | $(ZnO)_{90}(Cr_2O_3)_5(In_2O_3)_5$ | superior | good |
| 7 | $(ZnO)_{80}(SiO_2)_{20}$ | superior | bad |
| 8 | $(ZnO)_{80}(TiO_2)_5(In_2O_3)_{15}$ | superior | unacceptable |
| 9 | ZnO | good | unacceptable |
| 10 | $Cr_2O_3$ | unacceptable | unacceptable |
| 11 | $(ZnO)_{40}(Cr_2O_3)_{60}$ | unacceptable | unacceptable |
| 12 | $(ZnO)_{99}(Cr_2O_3)_1$ | superior | unacceptable |

<meaning of each symbol>

| symbol | before acceleration | fall after acceleration |
|---|---|---|
| superior | 44 dB or more | less than 0.5 dB |
| good | between 42 dB and 44 dB or less | between 0.5 dB and 1.0 dB or less |
| unacceptable | between 40 dB and 42 dB or less | between 1.0 dB and 3.0 dB or less |
| bad | less than 40 dB | 3.0 dB or more |

According to table 1, the discs 1 to 6 of the working examples of the present invention all exhibit a sufficient C/N ratio prior to acceleration and exhibit superior storage reliability that has fallen only slightly after acceleration. On the other hand, the discs 7 to 12 of the comparative example have different materials and composition ratios to the present invention. The C/N ratio therefore falls substantially for all of the discs 7 to 12 after acceleration and storage reliability is therefore no longer sufficient.

Similar experimentation was also carried out in the following cases: the case of the second information layer; the case of a single information layer of only the second information layer where there is no first information layer and intermediate layer and where the transparent substrate is 100 μm thick; the case of different write-once recording layer materials such as Te—O—Au, Sb—O—Ag, and In—O; the case of a rewritable recording material; or the case where not reflective layer is provided. However, the relative merits of the storage reliability did not change with the materials and compositions of each dielectric layer.

Second Working Example

The discs were made with the same materials as the discs made in the first working example with the exception that various materials for the reflective layer of the first information layer were employed and that ZnO was used as an intermediate layer in place of the dielectric layer. As the working examples of this application, discs 13 to 19 are made using $Ag_{98}Pd_1Cu_1$, $Ag_{98}Ga_1Cu_1$, $Ag_{98}Y_1Cu_1$, $Ag_{99}Nd_1Bi_1$, $Ag_{99}Bi_1$, $Ag_{99.95}Bi_{0.05}$ and $Ag_{95}Bi_5$, respectively, for the reflective layer of the first information layer. Discs 20 to 24 were then made as comparative examples using $Ag_{99.98}Bi_{0.02}$, $Ag_{90}Bi_{10}$, $Ag_{99}Sn_1$, $Ag_{99}Mg_1$, and $Ag_{99}Ti_1Au_1$ for the reflective layer of the first information layer.

The discs were then evaluated in the same way as for the first working examples. The results for the first information layer are shown in table 2.

TABLE 2

| Disc No. | reflective layer | C/N ratio before acceleration | fall after acceleration |
|---|---|---|---|
| 13 | $Ag_{98}Pd_1Cu_1$ | superior | superior |
| 14 | $Ag_{98}Ga_1Cu_1$ | superior | superior |
| 15 | $Ag_{98}Y_1Cu_1$ | good | superior |
| 16 | $Ag_{98}Nd_1Bi_1$ | good | superior |
| 17 | $Ag_{99}Bi_1$ | superior | superior |
| 18 | $Ag_{99.95}Bi_{0.05}$ | superior | good |
| 19 | $Ag_{95}Bi_5$ | good | superior |
| 20 | $Ag_{99.98}Bi_{0.02}$ | superior | unacceptable |
| 21 | $Ag_{90}Bi_{10}$ | unacceptable | superior |
| 22 | $Ag_{99}Sn_1$ | good | unacceptable |
| 23 | $Ag_{99}Mg_1$ | unacceptable | good |
| 24 | $Ag_{98}Ti_1Au_1$ | unacceptable | good |

<meaning of each symbol>

| symbol | before acceleration | fall after acceleration |
|---|---|---|
| superior | 44 dB or more | less than 0.5 dB |
| good | between 42 dB and 44 dB or less | between 0.5 dB and 1.0 dB or less |
| unacceptable | between 40 dB and 42 dB or less | between 1.0 dB and 3.0 dB or less |
| bad | less than 40 dB | 3.0 dB or more |

Table 2 shows that discs 13 to 19 of the working example of the present invention all exhibit sufficient C/N ratio prior to acceleration and exhibit superior storage reliability after acceleration with just a slight fall in C/N ratio. On the other hand, the discs 20 to 24 of the comparative example differed in material and composition ratio to the present invention. All of the discs 20 to 24 therefore had small C/N ratios prior to acceleration or exhibit substantial falls in C/N ratio after acceleration. Storage reliability was therefore insufficient as a result.

Similar experimentation was also carried out in the following cases: the case of the second information layer; the case of a single information layer of only the second information layer where there is no first information layer and intermediate layer and where the transparent substrate is 100 μm thick; and the case of different write-once recording layer materials such as Te—O—Au, Sb—O—Ag, and In—O. However, the relative merits of the storage reliability did not change with the materials and compositions of each reflective layer.

Third Working Example

The discs were made with the same materials as the discs made in the first working example for dielectric layers of the first information layer with the exception of various materials used in the second embodiment as a reflective layer. In an embodiment of this application, discs 25 to 32 were made using combinations of $(ZnO)_{80}(Cr_2O_3)_{20}$ or $(ZnO)_{80}(Cr_2O_3)_5(In_2O_3)_{15}$ for the dielectric layer of the first information layer and $Ag_{98}Ga_1Cu_1$, $Ag_{99}Bi_1$, $Ag_{98}Y_1Cu_1$, $Ag_{99.95}Bi_{0.05}$, and $Ag_{95}Bi_5$ as the reflective layer. Discs 33 and 34 were also made as comparative examples using combinations of $Ag_{99}Mg_1$, and $Ag_{99}Ti_1Au_1$ in the reflective layer of the first information layer.

The discs were then evaluated in the same way as for the first working example. The disc were also evaluated overall for combinations of dielectric layers and reflective layers. This overall evaluation is an evaluation of the lower of the C/N ratios for before acceleration and after acceleration. The results for the first information layer are shown in table 3.

TABLE 3

| Disc No. | dielectric layer | reflective layer | C/N ratio before acceleration | C/N ratio fall after acceleration | overall evaluation |
|---|---|---|---|---|---|
| 25 | $(ZnO)_{80}(Cr_2O_3)_{20}$ | $Ag_{98}Ga_1Cu_1$ | superior | superior | superior |
| 26 | $(ZnO)_{80}(Cr_2O_3)_{20}$ | $Ag_{99}Bi_1$ | superior | superior | superior |
| 27 | $(ZnO)_{80}(Cr_2O_3)_{20}$ | $Ag_{98}Y_1Cu_1$ | good | superior | good |
| 28 | $(ZnO)_{80}(Cr_2O_3)_5(In_2O_3)_{15}$ | $Ag_{98}Ga_1Cu_1$ | superior | superior | superior |
| 29 | $(ZnO)_{80}(Cr_2O_3)_5(In_2O_3)_{15}$ | $Ag_{99}Bi_1$ | superior | superior | superior |
| 30 | $(ZnO)_{80}(Cr_2O_3)_5(In_2O_3)_{15}$ | $Ag_{98}Y_1Cu_1$ | good | superior | good |
| 31 | $(ZnO)_{80}(Cr_2O_3)_5(In_2O_3)_{15}$ | $Ag_{99.95}Bi_{0.05}$ | superior | good | good |
| 32 | $(ZnO)_{80}(Cr_2O_3)_5(In_2O_3)_{15}$ | $Ag_{95}Bi_5$ | good | superior | good |
| 33 | $(ZnO)_{80}(Cr_2O_3)_5(In_2O_3)_{15}$ | $Ag_{99}Mg_1$ | unacceptable | good | unacceptable |
| 34 | $(ZnO)_{80}(Cr_2O_3)_5(In_2O_3)_{15}$ | $Ag_{98}Ti_1Au_1$ | unacceptable | good | unacceptable |

<meaning of each symbol>

| symbol | before acceleration | fall after acceleration |
|---|---|---|
| superior | 44 dB or more | less than 0.5 dB |
| good | between 42 dB and 44 dB or less | between 0.5 dB and 1.0 dB or less |
| unacceptable | between 40 dB and 42 dB or less | between 1.0 dB and 3.0 dB or less |
| bad | less than 40 dB | 3.0 dB or more |

Table 3 shows that discs 26 to 32 of the embodiment of the present invention all exhibit sufficiently high C/N ratio prior to acceleration and exhibit superior storage reliability after acceleration with just a slight fall in C/N ratio. Sufficient results for practical use are also obtained in the overall evaluation. On the other hand, the discs 33, 34 of the comparative example differed in material and composition ratio to the present invention. The C/N ratio prior to acceleration was small for either disc. Storage reliability was therefore insufficient and was also insufficient in the overall evaluation. It can be confirmed that specific combinations of materials of a dielectric layer and a reflective layer for the present invention are effective.

INDUSTRIAL APPLICABILITY

The optical information recording medium, the recording/reproducing method and the recording/reproducing device of the present invention are useful for media for storing data that can be put into electronic form such as images, audio, and information.

The invention claimed is:

1. An optical information recording medium comprising:
   a transparent substrate;
   at least one information layer having a recording layer and a dielectric layer this order on said transparent substrate, wherein said recording layer includes one or more oxide base materials selected from a group consisting of Te—O, Sb—O, Bi—O, Ge—O, Sn—O, Ga—O and In—O, and
   said dielectric layer including greater than or equal to 60 molecule percent and less than or equal to 98 molecule percent of Zn—O, and greater than or equal to 2 molecule percent to less than or equal to 40 molecule percent of one or more compounds selected from a group consisting of Y—O, Ce—O, Nb—O, Ta—O, Cr—O and Mo—O.

2. The optical information recording medium according to claim 1, wherein said dielectric layer includes a first side and a second side, said second side being opposite said first side, said first side of said dielectric layer being on said recording layer, and said at least one information layer further comprises a reflective layer on said second side of said dielectric layer.

3. An optical information recording medium comprising:
   a transparent substrate; and
   at least one information layer having a write-once recording layer, a dielectric layer including greater than or equal to 60 molecule percent and less than or equal to 98 molecule percent of Zn—O, and a reflective layer disposed in this order on said transparent substrate,
   said reflective layer including a main component of greater than or equal to 95 molecule percent and less than or equal to 99.95 molecule percent including Ag, and a sub-component of greater than or equal to 0.05 molecule percent to less than or equal to 5 molecule percent of one or more elements selected from a group consisting of Pd, Cu, Bi, Nd, Y, and Ga.

4. An optical information recording medium comprising:
   a transparent substrate;
   a recording layer including one or more oxide base materials selected from the group consisting of Te—O, Sb—O, Bi—O, Ge—O, Sn—O, Ga—O and In—O, a dielectric layer including greater than or equal to 60 molecule percent to less than or equal to 98 molecule percent of Zn—O, and a reflective layer, disposed in this order on said transparent substrate,
   said reflective layer including a main component of greater than or equal to 95 molecule percent and less than or equal to 99.95 molecule percent including Ag, and a sub-component of greater than or equal to 0.05 molecule percent to less than or equal to 5 molecule percent of one or more elements selected from the group consisting of Pd, Cu, Bi, Nd, Y, and Ga.

5. The optical information recording medium according to claim 4, wherein the oxide is Zn—O.

6. The optical information recording medium according to claim 3, wherein said dielectric layer includes greater than or equal to 2 molecule percent to less than or equal to 50 molecule percent of one or more compounds selected from the group consisting of Y—O, Ce—O, Nb—O, Ta—O, Cr—O and Mo—O.

7. The optical information recording medium according to claim 1, wherein said recording layer further includes one or more elements selected from the group consisting of Te, Sb, Bi, Ge, Sn, Ga, In, Pd, Au, Pt, Ni, Ag and Cu.

8. The optical information recording medium according to claim 1, wherein said recording layer includes Te—O-M, where M is one or more elements selected from a group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au, and Bi.

9. The optical information recording medium according to claim 1, wherein said dielectric layer further comprises greater than or equal to 2 molecule percent to less than or equal to 40 molecule percent of one or more compounds selected from a group consisting of Al—O, Ga—O, In—O, Bi—O and Sb—O.

10. The optical information recording medium according to claim 2, wherein said reflective layer comprises equal to or more than 95 molecule percent of Ag.

11. The optical information recording medium according to claim 10, wherein said reflective layer includes a main component of greater than or equal to 95 molecule percent and less than or equal to 99.95 molecule percent including Ag, and a sub-component of greater than or equal to 0.05 molecule percent to less than or equal to 5 molecule percent of one or more elements selected from a group consisting of Pd, Cu, Bi, Nd, Y, and Ga.

12. The optical information recording medium according to claim 1, wherein said recording layer has a first side and a second side, said second side being opposite said first side, said dielectric layer being on said first side of said recording layer, and said information layer further includes a protective layer on said second side of said recording layer.

13. The optical information recording medium according to claim 1, wherein said information layer includes a first side and a second side, said first side being opposite said second side, said transparent substrate being on said first side of said information layer, and said optical information recording medium further comprising a protective substrate disposed on said second side of said information layer.

14. The optical information recording medium according to claim 1, wherein said information layer has a groove with a groove pitch of less than or equal to 1 μm.

15. The optical information recording medium according to claim 1, further comprising one or more information layers disposed between said transparent substrate and said information layers and/or on the opposite side of said information layer to said transparent substrate.

16. A recording/reproducing method for an optical information recording medium, said method comprising:
performing recording/reproduction for the optical information recording medium according to claim 1 using an optical beam of a wavelength of less than or equal to 450 nm.

17. A recording/reproduction apparatus for an optical information recording medium, said apparatus comprising:
at least a recording/reproduction unit configured to irradiate the optical information recording medium according to claim 1 with an optical beam of a wavelength of less than or equal to 450 nm and configured to perform recording/reproduction, and a detecting unit configured to detect light reflected by the optical information recording medium.

* * * * *